E. O. ELLIOTT.
BRAKE BEAM SAFETY HANGER.
APPLICATION FILED MAY 22, 1915.
1,147,793.
Patented July 27, 1915.
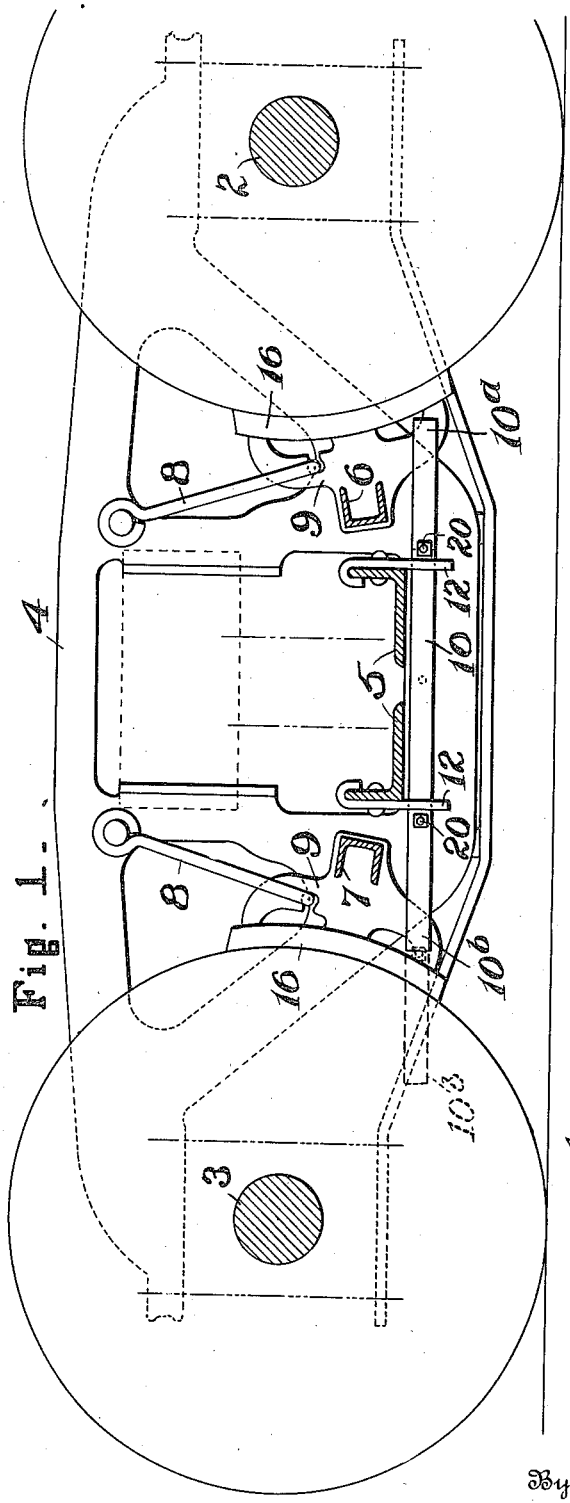
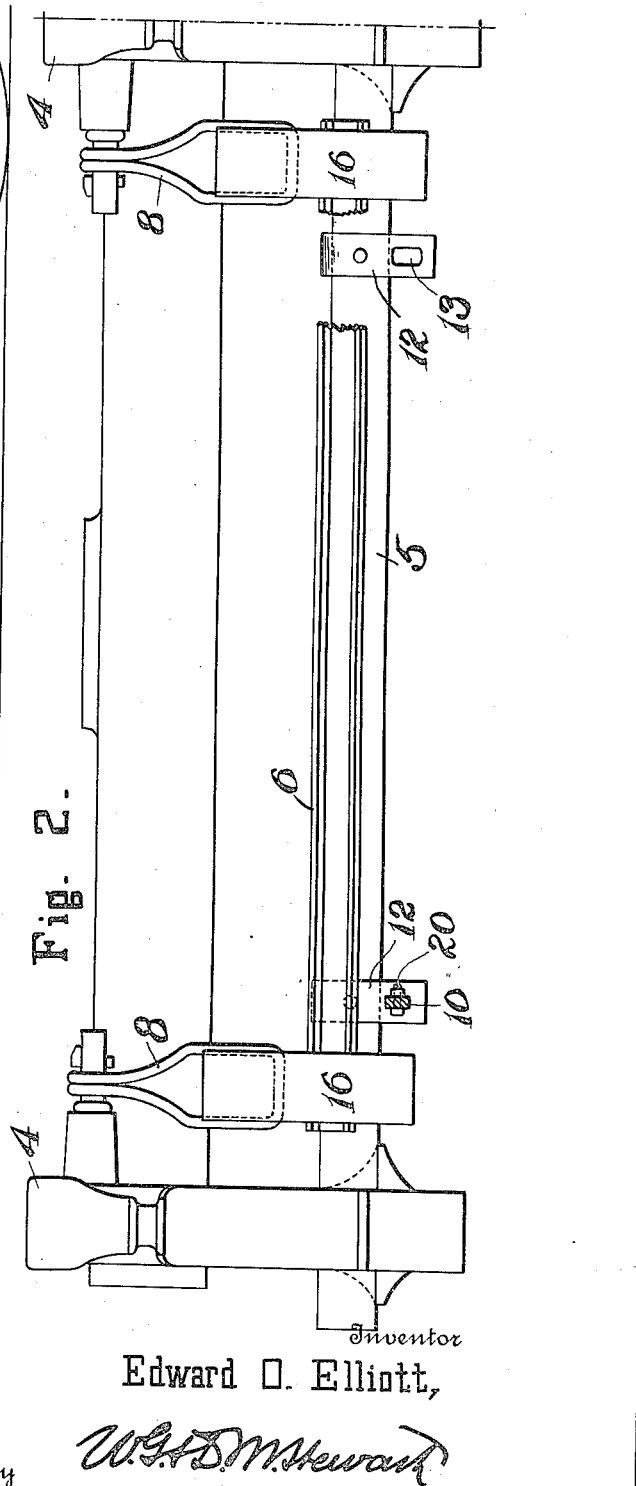
Inventor
Edward O. Elliott,
By W.G.H.D.M. Stewart
his Attorneys

UNITED STATES PATENT OFFICE.

EDWARD O. ELLIOTT, OF PHILADELPHIA, PENNSYLVANIA.

BRAKE-BEAM SAFETY-HANGER.

1,147,793.  Specification of Letters Patent.  Patented July 27, 1915.

Application filed May 22, 1915. Serial No. 29,758.

*To all whom it may concern:*

Be it known that I, EDWARD O. ELLIOTT, a citizen of the United States, residing at Philadelphia, in the county of Philadelphia and State of Pennsylvania, have invented certain new and useful Improvements in Brake-Beam Safety-Hangers, of which the following is a specification.

My invention relates particularly to brake mechanism for railway trucks; and it consists in providing simple and effective means as hereinafter fully described and specifically pointed out in the claims, for preventing the dropping of the brake beams to the track or road bed in case of accidental breakage of the suspension means therefor, while at the same time permitting the beams to be readily unhung or hung when desired.

Figure 1 is a diagrammatic side view of a portion of a truck frame having my invention applied thereto in preferred manner; and Fig. 2 is a partial end view of the same.

The front and rear axles 2 and 3, are shown as mounted in a truck frame 4 of known form comprising a central transverse spring plank or beam 5 of channel section; and the front and rear brake beams, 6 and 7, respectively, suspended from the truck by suitable links 8, carry brake heads 9 provided with shoes 16; the general arrangement thus briefly referred to being well known, and the detail construction thereof being immaterial to my invention, which relates entirely to the brake-beam safety hanger mechanism shown in connection therewith.

In order that a brake beam, 6 or 7, may be safeguarded so as to prevent the serious danger of its causing wreckage by being dropped to the road bed it is necessary that an auxiliary support be provided therefor adapted to come into service in case of breakage of the ordinary supporting means. And to satisfactorily accomplish this purpose it is also practically necessary that such emergency supporting means be adapted to permit of the quick and convenient unhanging and hanging of the brake mechanism, which operations are apt to be called for in service; and it is further important that it be simple and inexpensive in construction and application.

My improved means fully meet these requirements, the essential part thereof being a safety bar 10, so supported beneath the parallel brake beams 6 and 7 as to normally extend beyond both these at the opposite ends 10ª, 10ᵇ, but at the same time capable of being readily moved lengthwise, or at right angles to the direction of the beams, for the purpose of leaving one or the other beam free to drop when desired. As shown, this safety support 10, is merely a rolled bar of rectangular cross-section; and the means for carrying it are fixed hangers 12, 12, suitably secured to the truck frame respectively forward and rearward of the center line of the truck, and having their depending ends provided with apertures or guideways 13, 13 in which the bar is loosely engaged so as to be easily moved longitudinally. The width of the bar is arranged vertically as indicated, so as to give it maximum rigidity in carrying the weight of a brake beam when emergency requires it; and any suitable means are provided for normally positioning the ends of the bar beneath the respective beams, such means consisting, as indicated, of stop bolts 20, 20 inserted in properly spaced holes in the bar, so that any one of them is readily removable to enable endwise movement of the bar. Obviously such bar and hangers are similarly applicable on each side of the truck, and the selected forms particularly shown may be readily modified without departing from the invention.

What I claim is:

1. In combination with a truck frame, and a transverse brake beam suspended therefrom; a hanger fixed to said frame, a brake-beam safety bar carried by said hanger and longitudinally movable therein at right angles to the beam, and means for locking said bar in safe-guarding position beneath the beam.

2. In combination with a truck frame, and transverse brake beams suspended therefrom for the front and rear wheels respectively; front and rear hangers fixed to said frame, a safety bar for both of said beams, carried by said hangers and longitudinally movable therein to inoperative position for one or other of said beams, and means for locking said bar in safeguarding position for both beams.

3. In combination with a truck frame, and transverse brake beams suspended therefrom for the front and rear wheels respectively; front and rear hangers fixed to said frame, and each provided with a vertically-slotted depending end; a safety bar for both said beams, of rectangular cross-section and carried edgewise in said slotted hangers so as to be longitudinally movable therein; and removable means for normally positioning the ends of said bar beneath the respective beams.

In testimony whereof I affix my signature.

EDWARD O. ELLIOTT.

Witness:
ADAM L. OTTERBEIN.